(12) United States Patent
Alberty

(10) Patent No.: US 10,363,529 B1
(45) Date of Patent: Jul. 30, 2019

(54) METHOD OF MIXING CROSSLINKING BLENDS IN TOTES FOR USE TO CROSSLINK POLYMER MODIFIED ASPHALTS

(71) Applicant: John R. Alberty, Baton Rouge, LA (US)

(72) Inventor: John R. Alberty, Baton Rouge, LA (US)

( * ) Notice: Subject to any disclaimer, the term of this patent is extended or adjusted under 35 U.S.C. 154(b) by 126 days.

(21) Appl. No.: 15/623,200

(22) Filed: Jun. 14, 2017

Related U.S. Application Data

(60) Provisional application No. 62/350,247, filed on Jun. 15, 2016.

(51) Int. Cl.

| | | |
|---|---|---|
| *B01F 11/00* | (2006.01) | |
| *E01C 19/00* | (2006.01) | |
| *C08J 3/24* | (2006.01) | |
| *C08L 95/00* | (2006.01) | |
| *B01F 15/00* | (2006.01) | |
| *B01F 13/00* | (2006.01) | |
| *E01C 19/10* | (2006.01) | |
| *E01C 7/30* | (2006.01) | |

(52) U.S. Cl.
CPC ...... *B01F 11/0071* (2013.01); *B01F 13/0032* (2013.01); *B01F 15/00253* (2013.01); *C08J 3/24* (2013.01); *C08L 95/00* (2013.01); *E01C 19/1013* (2013.01); *B01F 2215/0063* (2013.01); *C08J 2395/00* (2013.01); *C08L 2555/54* (2013.01); *E01C 7/30* (2013.01)

(58) Field of Classification Search
CPC .............. B01F 11/0071; B01F 13/0032; B01F 15/00253; B01F 2215/0063; C08J 3/24; C08J 2395/00; C08L 95/00; C08L 2555/54; E01C 19/1013; E01C 7/30
See application file for complete search history.

(56) References Cited

U.S. PATENT DOCUMENTS

| | | | | |
|---|---|---|---|---|
| 3,021,566 A | * | 2/1962 | Sommer | ................ C08L 95/00 264/109 |
| 5,486,554 A | * | 1/1996 | Truax | ...................... C08L 95/00 523/324 |
| 8,377,285 B2 | * | 2/2013 | Burris | ...................... C10C 3/04 106/273.1 |

* cited by examiner

*Primary Examiner* — Anshu Bhatia
(74) *Attorney, Agent, or Firm* — Jones Walker LLP

(57) ABSTRACT

A method of mixing a crosslinking blend in a portable tote for use to crosslink polymer modified asphalts. The method includes providing a portable tote, where the tote includes a tank having a sidewall, a top and a bottom portion. Fixedly positioned partially within the tank interior is an air mixing system that includes a hollow wand that has a distal and a proximal end. The proximal end of the wand exits the tank. The distal end of the tote is connected to at least one accumulator plate, where the accumulator plate is adjacent to the interior bottom portion of the tank. Stored in the interior of the tank is a crosslinking blend suitable for use to crosslink polymer modified asphalts. The method includes the steps of attaching a pulsed gas controller to the proximal end of the wand and coupling a source of compressed gas to the controller, then activating the controller to cause mixing of the crosslinking blend by pulsing gases into the crosslinking blend for a sufficient period of time. After, or during mixing, the crosslinking blend is discharged from the interior of the tank, and the controller is removed from the wand, leaving said wand attached to the tank.

11 Claims, 3 Drawing Sheets

METHOD OF MIXING CROSSLINKING BLENDS IN TOTES FOR USE TO CROSSLINK POLYMER MODIFIED ASPHALTS

CROSS-REFERENCE TO RELATED APPLICATION

This application claims the priority benefit of U.S. provisional application No. 62/350,247 filed on Jun. 15, 2016, which is hereby incorporated by reference.

BACKGROUND

The asphalt industry produces multiple asphalt (bitumen) compositions in preparing aggregate compositions useful as road paving material, such as using bitumen pitch in combination with sand or gravel). The asphalt must meet defined parameters relating to properties such as viscosity, stiffness, penetration, toughness, tenacity and ductility for the specific application. For particular applications, conventional bitumen compositions can be modified by the addition of other substances, such as polymers. A wide variety of polymers have been used as additives in asphalts, to improve physical and mechanical performance properties. Polymer-modified asphalts are routinely used in the road construction/maintenance and roofing industries, and by incorporating into them an elastomeric-type polymer (e.g., a rubber, such as SBR or SBS rubber from Kraton Corp), which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) polymer and advantageously a random or block copolymer of styrene and a conjugated diene. The modified asphalts thus obtained commonly are referred to variously as bitumen/polymer binders or asphalt/polymer mixes or "modified asphalts." It is also known that the stability of polymer-bitumen compositions can be increased by the addition of crosslinking agents, including vulcanizing agents such as sulfur, frequently in the form of elemental sulfur. The sulfur chemically couples with the polymer and the bitumen through sulfide and/or polysulfide bonds. See U.S. Pat. No. 6,133,351, and WO-2006-047044, and U.S. Pat. No. 6,569,351 all incorporated by reference. These sulfur crosslinked blends or formulations have demonstrated the ability to optimize the polymer addition, reduce production costs, increase production capacity, crosslink at less than 350° F., and improve the compatibility characteristics of the asphalt. The improved compatibility allows use of less expensive generic polymers such as Kraton D1101 (from Kraton Polymers, of Houston, Tex. (a Kraton Corp. company)) with a broad range of asphalts. As used herein, a crosslinking blend includes a sulfur product (not necessarily elemental sulfur) in a suitable carrier, such as, for instance a low viscosity petroleum based oil, for use in combination with modified asphalts.

One method to prepare a crosslinked composition for use in a modified asphalt product is to pre-mix an oil based blended product, containing other desired additives, such as crosslinking additives, accelerators, initiators, and $H_2S$ suppressants. The resulting premixed oil based product will later be added or mixed with the polymer asphalt product. For instance, one crosslinking material is AS-3000 Plus available from Alberty Additives, LLC in Baton Rouge, La., and contains a sulfur product in a petroleum oil, such as paraffinic petroleum oil with proprietary accelerators to facilitate rapid reaction of the rubber/polymer with the asphalt. These accelerators allow higher asphalt throughput in the production facility. The crosslinking material may include a proprietary dispersant. Another crosslinking product is BGA, U.S. Pat. No. 6,569,925 B2, from Ergon Armor (an Ergon, Inc. company) of Memphis Tenn., (hereby incorporated by reference).

In application, the crosslinking material is delivered in a container, such as in a 360-gallon barrel or a 275 gallon cone or frustrum tote container, to be mixed with the heated asphalt/polymer material. The crosslinking product is pumped from the tote, such as with a gear pump or air diaphragm pump, to be added to the asphalt polymer composition in specified dosages. Often, the crosslinking materials may be stored in the tote or barrel for a period of time, such as for two-three weeks, prior to being combined with the asphalt mixture. Solids in the tote-stored crosslinking product, over time, will settle out, requiring that the crosslinking product be mixed prior to adding to the asphalt/polymer (e.g., rubber) mixture.

Several techniques have been used to mix the crosslinking products, such as using a hand held blade shear mixer, or using a pulsed air system, such as a Pulsair portable wanded mixer (e.g., a 10-55 tote stick), from Pulsair Systems, Inc. of Bellevue, Wash. The Pulsair system sends pulses of compressed air through a hollow wand or probe. At the distal end of the wand is a flat circular shaped accumulator plate, such as a 4 to 6 inch metal accumulator plate. The accumulator plate helps to shape the released pulse of air to more effectively mix, and when mixing, is preferably positioned near the bottom of the tank. A Pulsair controller is located at the operator end of the wand. The Pulsair controller allows an operator to control the frequency of the pulses and the pressure of pulses. In use, the sudden release of air shocks the crosslinking liquid. As the air squeezes out between the plate and tank floor, it sweeps out the heavier liquids and solids. The air then accumulates above the plate into a very large, single oval shaped bubble. The bubble rises to the surface, a vacuum is created that pulls the heavier bottom liquids and solids up with it. As the bubble rises it also pushes the liquid above it up and out towards the tank perimeter. The liquid moves toward the sides of the tank and travels down the tank wall to the bottom.

To mix the crosslinking composition using the Pulsair system, the Pulsair wand and accumulator is inserted into an opening or bung in the tank. The operator selects a suitable frequency and air pressure, attaches a source of compressed air or gas (such as a compressor which may form part of the Pulsair system) and mixes for a period of time (for instance, a 360-gallon drum may require 20 minutes to two hours of mixing using 40 to 120 psi pressure at a frequency that can be varied, such as from 10-60 cycles per minute). The crosslinking product can be pumped to the asphalt/polymer product while mixing. When finished, the Pulsair mixer is removed from the drum or tote. While not arduous, the spillage or splash out from the open container and drippings from the mixer wand after removal can result in an unwanted discharge of product to the ground, which creates an unsafe and dirty operator environment. A better method of mixing is needed.

DESCRIPTION OF THE PREFERRED EMBODIMENT

Figure 1A:
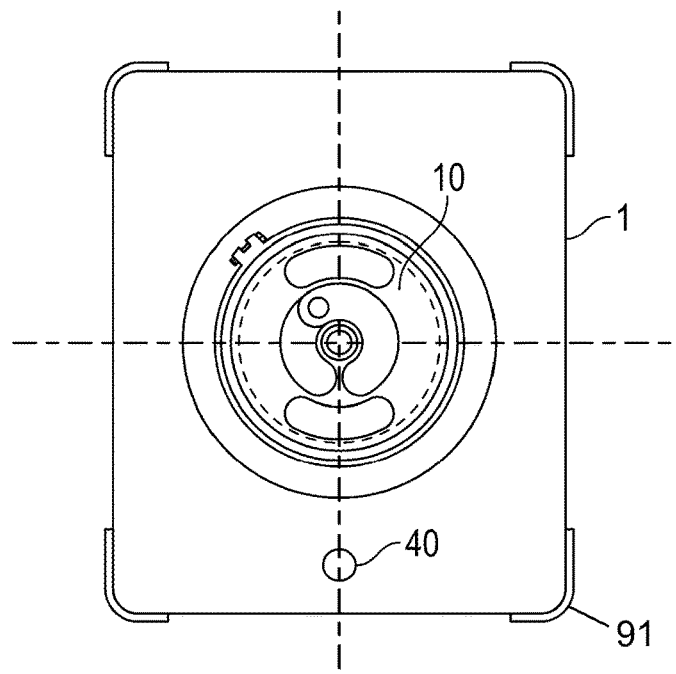
FIG. 1A is a top elevation view of one embodiment of a tote having one embodiment of air dispersion system positioned therein.

One embodiment of the invention includes a portable storage tank or tote that has a pre-installed pulsed air wand in the tank. Shown in FIG. 1A-1D is one embodiment of a tote. As shown, the tote is a 275-gallon capacity tank that has a square top shape, and a square frustum shaped bottom end (other shapes for the tank are feasible, including truncated cones), with either a square or round top shape, and one or more sidewalls joining the bottom end to the top. The tank 1 preferably has a center closable opening 10 located on the top of the tank, a small opening 40 in the top of the tank (such as a 2' bung opening) or a ½ inch drilled opening, and an opening 20 in the bottom of the tank to which a valve will be attached, for draining the tank. The crosslinking product tank preferably has a third opening on the top of the tank, for venting of the tank during mixing, and this opening may be coupled to a pressure relief valve. In the tote of FIG. 1, the tote includes an external frame 300 including a frame side frame and bottom frame members 90 that support the tank in the interior of the frame 300. The frame 300 allows for fork lift movement, or for lifting of the tote using top frame members 91 that have eyelets for lifting (such as with a crane-like device).

Positioned in the interior of the tank is an air dispersion system that includes a hollow wand having a distal end 4 and proximal end 5 The proximal end 5 is fixedly attached to the tank, such as coupled to a tank opening 40 with a coupling member. As shown, the proximal end 5 of the wand is coupled to the top of the tank 1, such as at the bung opening 40 or at a ½ drilled hole, using a bulk head fitting to secure the wand. The proximal end of the wand 5 protrudes above the top surface of the tank 1, and preferably, terminates in a connector 9, such as a quick connector. A removable cap (such as a threaded cap, or quick connect cap) can cover the protruding terminating proximal end 5 of the wand.

Figure 1B:
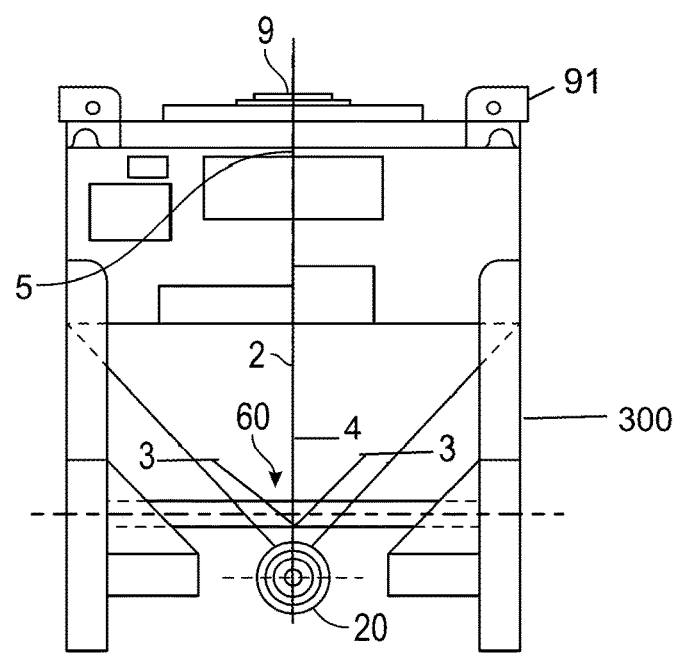
FIG. 1B is a side elevation ghosted view of the tote of FIG. 1A depicting an air injection system positioned therein.
Figure 1C:
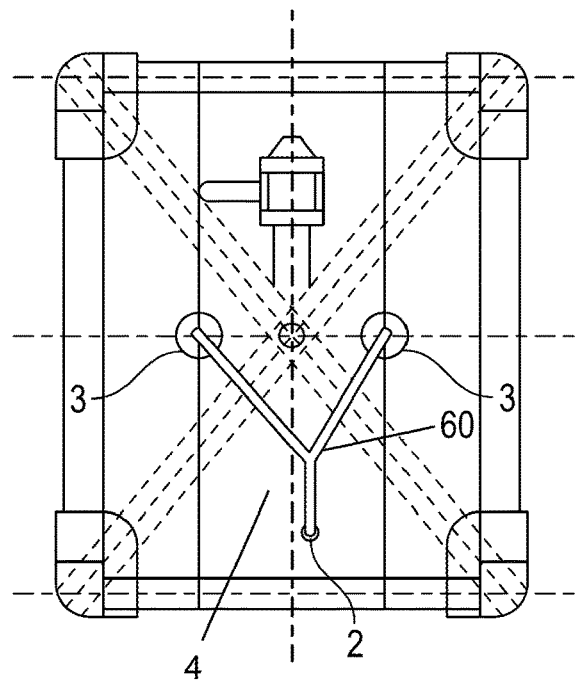
FIG. 1C is a bottom elevation ghosted view of the tote of FIG. 1A depicting one embodiment of an air or gas injection system positioned therein.
Figure 1D:
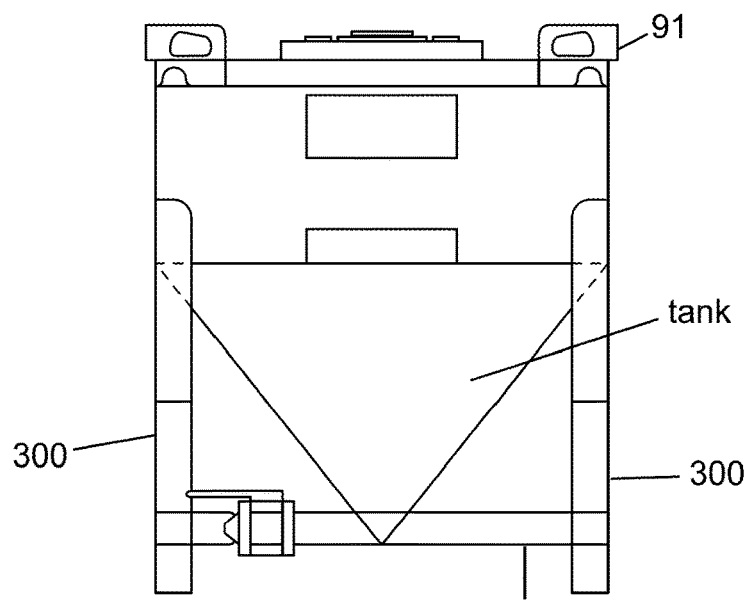
FIG. 1D is another side elevation view of the tote of FIG. 1A.

The distal end 4 of the wand terminates in a distribution manifold 60. The manifold 60 is generally one or more hollow pipes, attached or connected to the distal end 4 of the wand (such as by tubing connectors). The distribution manifold 60 terminates in one or more generally planar accumulator plates 3. The accumulator plates 3 may threadably attach to the distribution manifold 60. Preferably, the accumulator plates 3 will be located adjacent to the bottom of the tank (about ½-2 inches off the bottom of the tank) and the planar accumulators 3 will preferably be installed substantially parallel to the tank floor section to which the accumulator is adjacent. As shown in FIG. 1C, two accumulators 3 are used. For instance, if the tank bottom forms a 45 angled truncated frustum, the accumulator plates preferably are angled with respect to the wand shaft at 45 degrees to run parallel with the tank sidewalls, such as depicted in FIG. 1B. For a curved bottom tank, parallel can only be approximated with a flat accumulator plate. Preferably, the accumulators are located ⅓rd of the distance from the center of the tank bottom to the join of the tank bottom with the vertical sidewall of the tank (for instance, the frustum sidewalls), but placement can vary and does not have to be symmetric between accumulators. A preferred accumulator in a 275-gallon tote is a 3-6 inch diameter circular accumulator plate. More accumulator plates can be used, and the number can vary depending on tank or tote geometry, For instance, with a barrel shaped tote, four or more accumulator plates may be desirable.

The wand and distribution manifold are intended to be semi-permanently installed in the tank, but removable for repairs when needed. In use, a tank can be retrofitted with the wand distribution manifold accumulator system. Crosslinking product is then added to the now wanded tank/tote, and shipped to the desired location for combination with the modified asphalt product. At the desired location, when mixing of the crosslinking product is desired, an air or gas controller, such as a Pulsair controller, is attached to the proximal end of the wand, such as with a quick connector. A source of compressed air or inert gas is then coupled to the air controller (such as by coupling to an air compressor) and mixing of the crosslinking product is then performed. When mixing is complete, the air controller may be removed, leaving the wand installed in the tank (alternatively, mixing can be continued as product is discharged from the tote). As the wand remains in the tote, the oil based blended material does not spill or drip on the operator or work area. Clean up is eliminated or reduced, and unsafe working conditions resulting from slippery oil on work surfaces is avoided. This is a significant operational advantage as manpower requirements are pressing and critical during the asphalt crosslink operation. This operational advantage translates into a competitive advantage for Alberty Additives, LLC in the Modified Asphalt market place.

The pulsing air mixing system has shown significant improvement in allowing the crosslink material to be pumped from the tote. Typical heels (material that remains in the tote after application) can be as high as 600 pounds of crosslink material. The internally mounted Pulsair system results in heels as low as 30 pounds and averages less than 100 pounds. The pulses assist in scouring action, lifting deposited materials into suspension.

The mixed crosslinking product or blend is then pumped from the bottom or near the bottom of the tank to be combined with the asphalt. In one sequence, the polymer may have been added and thoroughly mixed into the asphalt prior to addition of the crosslinking product. Alternatively, after suitable mixing, the crosslinking product may be discharged while mixing of the polymer occurs within the asphalt tank. Once the crosslinking product tank is drained, it may be desirable to operate the air system to purge any product within the distribution system/wand. The pulsed gas mixing allows for even distribution of the sulfur in the crosslinking blend (providing for better results when mixing with the modified asphalt) and also allows for removal of substantially all of the crosslinking blend from the tote tank.

Figure 2A:
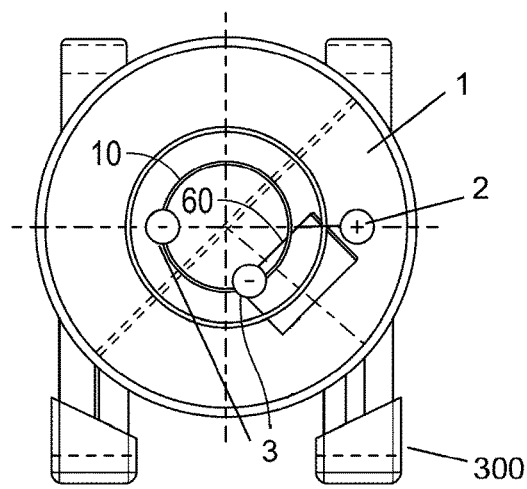
FIG. 2A is a top elevation view of another embodiment of a tote having one embodiment of air dispersion system positioned therein.
Figure 2B:
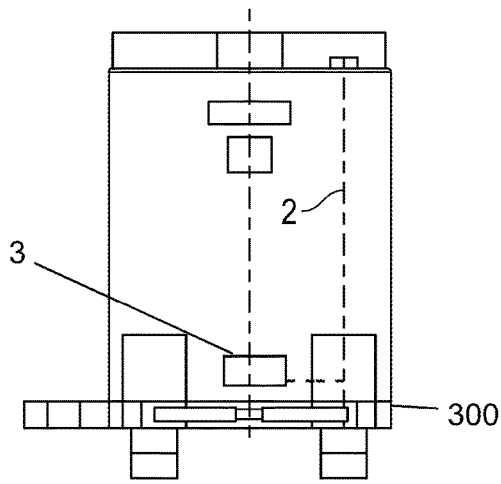
FIG. 2B is a side elevation ghosted view of the tote of FIG. 2A.
Figure 2C:
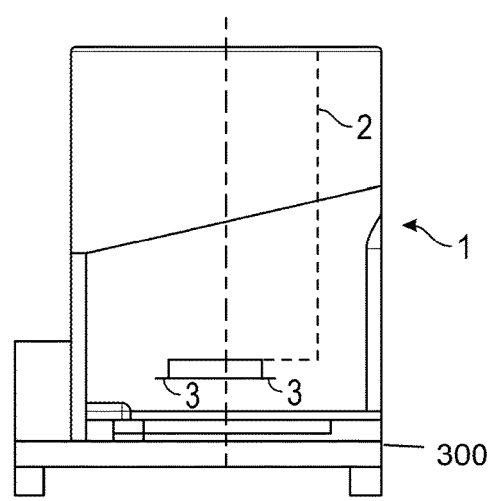
FIG. 2C is a ghosted side elevation view the tote of FIG. 2A depicting an air injection system positioned therein.

Shown in FIG. 2A-2C is a cylindrically shaped 360-gallon drum, mounted on an external frame, thereby forming the tote, also used to transport crosslinking product. The drum has a top opening, a smaller top bung opening, a top opening for a pressure relief valve, and a bottom opening connected to a valve body for draining the tank. A similar wand system is installed in the drum, such as at the bung location, or in an opening created for the wand system. As shown in FIG. 2B, a circular shaped manifold with two or more accumulators installed, using 4-inch round accumulator plates 3. A "V" or "U" shaped manifold or other suitable shaped manifold 60 may be used. Other tank shapes are within the scope of the inventions, such as a square or rectangular shaped tank attached to a bottom frame (to allow forklift movement of the tote).

For small tanks, two accumulator plates are deployed. For larger tanks, or for tanks with vertical walls, such as a barrel shaped tank, more accumulators may be needed to provide sufficient mixing and scouring of the bottom portion of the tank. With additional accumulators, higher gas pressures may be needed to provide sufficient gas flow to the accumulators.

The invention claimed is:

1. A method of mixing a crosslinking blend in a portable tote for use to crosslink polymer modified asphalts comprising the steps of providing a portable tote, said tote comprising a rigid tank having a top portion, a bottom portion and a sidewall, defining a tank interior, and having an air mixing system fixedly attached to the tank, said air mixing system containing a hollow wand partially disposed in the interior of the tank, said wand having a proximal end and a distal end, said proximal end exiting the tank but fixedly attached to tank, said tote further comprising a bottom frame supporting said tank, said bottom frame configured to be lifted by a fork lift, said distal end of said wand having at least one accumulator plate positioned thereon, said accumulator plate positioned adjacent the interior bottom portion; said tank having stored therein a crosslinking blend suitable for use to crosslink polymer modified asphalt;

said method further comprising the steps of attaching a pulsed gas controller to said proximal end of said wand; attaching a source of compressed gas to said controller; activating said controller to thereby cause mixing of said crosslinking blend by pulsing gases out of the accumulator into the crosslinking blend for a sufficient period of time; discharging said crosslinking blend from the interior of said tank, and removing said controller from said wand, thereby leaving said wand attached to said tank.

2. The method of claim 1 wherein said crosslinking blend is positioned into the interior of the tank while the wand is positioned in the interior of the tank.

3. The method of claim 1 wherein said distal end of said wand has at least two accumulator plates connected by a distribution manifold.

4. The method of claim 1 wherein the tote further comprises an external frame, said tank being positioned substantially in the interior of the external frame.

5. The method of claim 2 wherein said crosslinking blend contains sulfur.

6. The method of claim 1 wherein said discharged mixed blend is pumped to a container containing a flowable asphalt.

7. The method of claim 1 wherein the position of the accumulator plate is substantially fixed in position in the interior of the tank.

8. The method of claim 1 wherein the tank forms an inverted frustum.

9. The method of claim 1 wherein the tank forms a cylindrical drum.

10. The method of claim 1 wherein the tank sidewall comprises four connected sidewalls, forming, in cross section, a rectangle or a square.

11. A method of mixing a crosslinking blend in a portable tote for use to crosslink polymer modified asphalts, comprising the steps of providing a portable tote, said tote comprising a rigid tank having a top portion, a bottom portion and a sidewall, defining a tank interior, and having a gas mixing system fixedly attached to the tank, said gas mixing system containing a hollow wand partially disposed in the interior of the tank, said wand having a proximal end and a distal end, said proximal end exiting the tank and fixedly attached to said tank, said tote further comprises a bottom frame supporting said tank, said bottom frame configured to be lifted by a fork lift, said distal end having at least one accumulator plate positioned thereon, said accumulator plate positioned adjacent the interior of the sidewall portion of the tank; said tank having located in the interior a crosslinking blend suitable for use to crosslink polymer modified asphalts;

said method further comprising the steps of attaching a pulsed gas controller to said proximal end of said wand; attaching a source of compressed gas to said controller, activating said controller to thereby cause gas mixing of said crosslinking blend by pulsed gas, for a sufficient period of time; discharging said crosslinking blend from the interior of said tote or container, and removing said controller from said wand, thereby leaving said wand attached to said tank.

* * * * *